United States Patent Office 3,090,033
Patented May 14, 1963

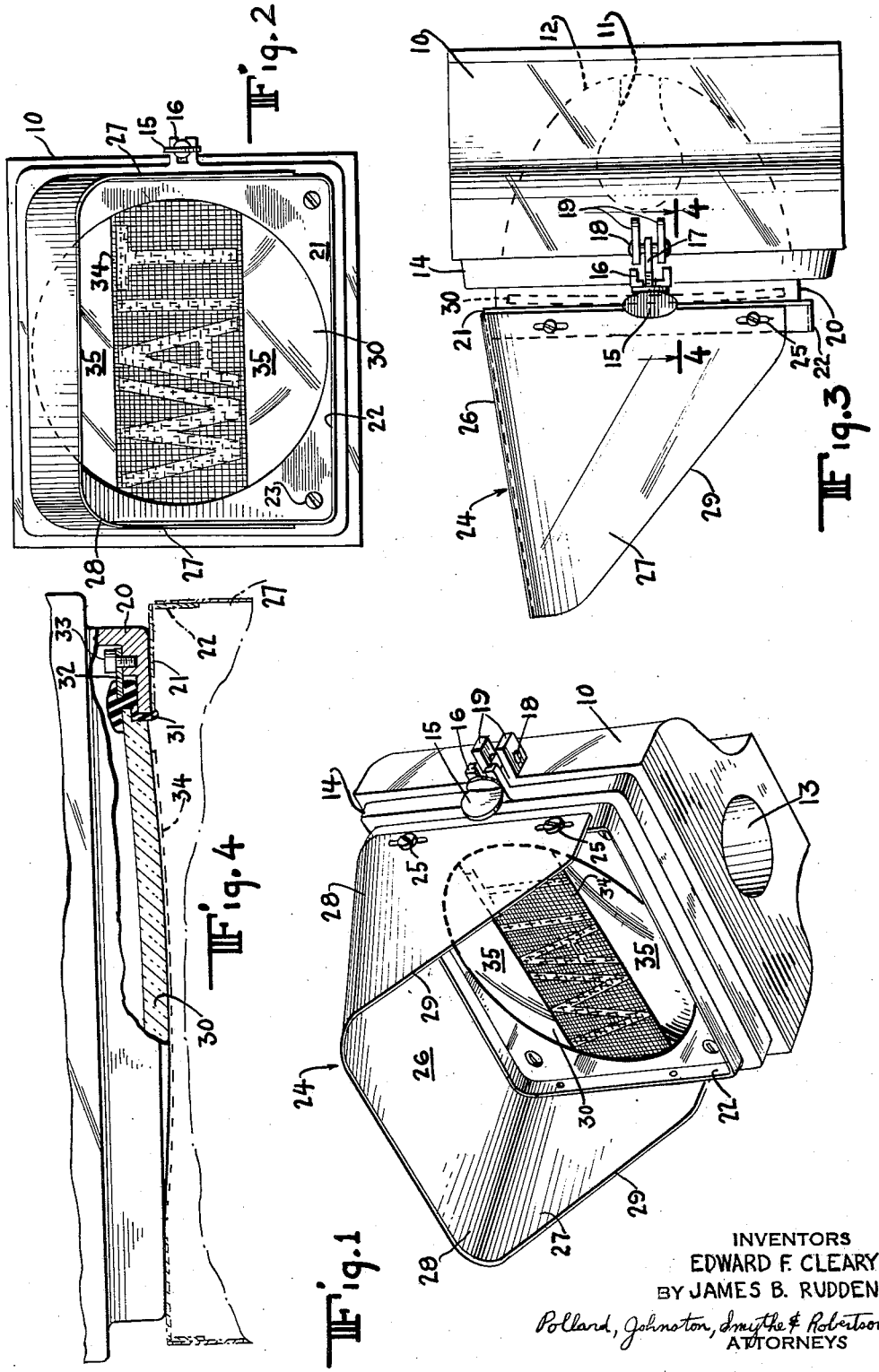

3,090,033
SIGNAL LIGHT
Edward F. Cleary and James B. Rudden, Baltimore, Md., assignors to Marbelite Co., Inc., Brooklyn, N.Y., a corporation of New York
Continuation of application Ser. No. 772,838, Nov. 10, 1958. This application June 29, 1960, Ser. No. 39,730
1 Claim. (Cl. 340—84)

The present invention relates to a traffic signal light of the type employed for the control and direction of vehicular and pedestrian traffic at road intersections. This application is a continuation of my copending application, Serial No. 772,838, filed November 10, 1958, now abandoned.

In previously available traffic signal lights, an assembly including a lamp housing, a lamp and reflector, a lens and a round visor have been used. The lamp and reflector is protected within the housing and the light is projected through the lens in the front of the housing. The circular lens conforms to the circular opening of the reflector and is colored red, yellow, or green, for example. A circular visor attached to the housing and surrounding the lens shields from sunlight, dust, and weather conditions.

The circular visor serves to reduce the lateral viewing angle of the lens by screening the lens from observers off to one side or the other of the signal light. For application such as multi-lane highways, toll-gates, or the intersection of roads at acute angles it is desired to reduce the viewing angle of the signal light lens so that the observer can only see the light that is intended to direct or control him and thus not be confused or misdirected. In these applications, the circular visor serves effectively. In some cases, the circular visor is extended into a long cylinder so as to achieve a very limited viewing angle.

However, many times a traffic signal light having a wide viewing angle is needed. Multi-lane highways often have points where the same direction or control signal is to be given to all lanes. Even in places where each lane of traffic has its own signal lights, it is often required that additional signals or indications applying to all lanes be provided.

It has been found that, in such cases, a single traffic signal having a wide viewing angle is a solution. When the lens of the signal is provided with indicating means, such as an arrow or words, it is necessary that there be at least a moderately wide viewing angle since merely a partial covering of the lens by the side portions of a circular visor would make the arrow or words unintelligible.

The requirement of a wide viewing angle for a traffic signal immediately introduces a problem since the circular visor needed to properly shield the lens also greatly reduces the viewing angle.

It is an object of the present invention to provide a traffic signal light having a wide lateral viewing angle.

The invention is particularly adapted for use in a traffic signal light to be observed over a wide angle, in which the lens is provided with indicating means or indicia such as arrows or words. It includes a lamp housing containing a holding device for the lamp. The front wall of the housing contains an opening in which the lens is mounted. The visor extending from the front wall of the housing includes a top and two sides. The planes of the sides meet the plane of the top at substantially right angles and the relieved sides extend from the top of the visor to the front wall of the housing. The resulting rectangularly shaped opening and relieved sides of the visor exposing the lens provides a wide lateral viewing angle of the lens.

These and other objects, features, and advantages of the invention will become apparent from the following detailed description and drawings which are merely exemplary.

In the drawings:

FIG. 1 is a perspective view of a traffic signal light.

FIG. 2 is a front elevational view of a traffic signal light.

FIG. 3 is a side elevational view of a traffic signal light.

FIG. 4 is a fragmentary sectional view taken along the line 4—4 of FIG. 3.

As shown in the drawings and particularly in FIGS. 1 and 3, the traffic signal light includes a housing 10, in which is mounted the lamp 11 in a suitable lamp holding means which may include reflector 12. The housing 10 is provided with a hole portion 13 through which a pipe or stanchion may pass or be attached so as to support the signal light. The light may, of course, be supported in other manners. A cover 14 is swingably attached to the housing 10 and is secured by thumb nut 15 when it is in contact with cover lugs 16. Thumb nut 15 engages screw 17 which is pivotally attached to pin 18, mounted in lugs 19.

Cover 14 is provided with an extension 20 containing a circular opening which aligns with the opening of reflector 12. Mounting plate 21, with flange 22 surrounding the plate's perimeter, is attached to circular extension 20 by screws 23. Visor 24 is supported by flange 22 of mounting plate 21 and is secured to the flange by means of screws 25. Visor 24 includes top portion 26 and side portions 27. The planes of the side portions meet the plane of the top portion at substantially right angles. The side portions 27 join the top portion 26 at faired junctions 28. The radial form of these junctions improves the appearance of the visor while at the same time simplifies its fabrication. Edges 29 of the side portions 27 extend downwardly from the outer edge 30 of visor 24 to the lower section of flange 22. The visor may be made of metal or a suitable plastic material.

As shown in FIG. 4, lens 30 which has a substantially flattened surface is mounted within the circular opening in plate 21. Gasket 31 may seal the perimeter of lens 30 to the circular opening of extension 20. Clips 32 are secured by screws 33 to circular extension 20 so as to hold lens 30 against gasket 31 and in position within the circular opening of extension 20.

As shown in FIG. 2, lens 30 preferably has a diameter which is less than the width and height of mounting plate 21. Across lens 30 there may be provided indicating means 34 such as an arrow or a word. In FIG. 2, the word "WAIT" is applied and it is illuminated by the light of lamp 11 projecting through the translucent letters. The outer portions 35 of lens 30 may be of the conventional colored glass used in traffic signal lights.

As is shown in FIG. 3, the top portion 26 of visor 24 is inclined downwardly from the open edges of flange 22. This sloping of the top portion 26 is intended to block the sun's rays from striking lens 30 when the sun is at low angles in the sky. If the sun's rays are permitted to shine directly through the lens, they will be reflected and give the illusion to an observer that the traffic signal light is illuminated by its regular lamp source of light.

As shown in FIGS. 1 and 2, top portion 26 and side portions 27 of visor 24 are displaced from the circumference of lens 30. In FIG. 1, it may be seen that the inclined edges 29 of side portions 27 and the outer edge of top portion 26 form a substantially rectangular opening exposing lens 30 to an observer. From the perspective view of FIG. 1, it is evident that the inclined edges 29 of side portions 27 and the overall rectangular form of visor 24 are substantially exposing lens 30 and its indicating means 34 to an observer who is off to one side of the traffic signal light. In this manner, the wide lateral viewing angle of the lens 30 is achieved. The downward sloping of the top portion 26 of visor 24 does not obstruct the lens 30 from an observer since, in all cases, a traffic signal light is mounted at an appreciable distance above any observers.

The perspective view of FIG. 1 also illustrates that the general appearance of the rectangular visor 24 and circular lens 30 is quite different from the circular visor and lens of conventional traffic signal lights. This difference serves as a quick means of identification of the subject traffic light from the conventional ones. This identifying feature is a helpful one since it eliminates the possibility of confusing a special traffic signal with its particular direction or command from traffic signals used in a more conventional manner. To further distinguish the traffic light signal, the rectangular visor 24 may be provided with a paint coating which is different from that used on conventional traffic signals.

It is to be understood that details of construction may be varied without departing from the spirit of the invention except as defined in the appended claim.

We claim:

A traffic signal adapter for securing a rectangular shaped wide lateral viewing visor to a traffic signal, said signal having a lens and a circular front portion containing said lens therein, comprising a rectangular mounting plate having a circular opening with which at least a portion of said lens may register, screws attaching said mounting plate to said circular front portion of said signal, said mounting plate having a face, a back and a peripheral flange extending at substantially right angles to said face and back, said flange having two vertical sides and two horizontal sides extending at right angles to the face and back of said mounting plate, and a visor including a rectangular top portion and substantially right triangular side portions extending from each of two side edges of said top portion at substantially right angles thereto, said side portions being attached to said vertical flanges of said mounting plate by screw means, whereby the visor and flange provide a wide lateral viewing angle of the front portion of said lens.

References Cited in the file of this patent
UNITED STATES PATENTS

| | | |
|---|---|---|
| 1,600,682 | McCarley | Sept. 21, 1926 |
| 2,401,171 | Leppert | May 28, 1946 |
| 2,448,302 | Eyerkuss | Aug. 31, 1948 |